United States Patent

Hestehave

[11] 3,887,316
[45] June 3, 1975

[54] APPARATUS FOR INJECTION-BLOW-MOLDING HOLLOW ARTICLES

[76] Inventor: Borge Hestehave, 8031 Beechwood Dr., Alta Loma, Calif. 91701

[22] Filed: Aug. 2, 1972

[21] Appl. No.: 277,274

[52] U.S. Cl. ............... 425/242 B; 425/DIG. 209; 425/DIG. 211
[51] Int. Cl. ............................................ B29c 5/06
[58] Field of Search..... 425/326 BJ, 425/DIG. 209, 425/DIG. 203 425/DIG. 204, DIG. 206, DIG. 211, DIG. 213, 326 B, 242 B, 324 B, 387 B, 342

[56] References Cited
UNITED STATES PATENTS

| | | | |
|---|---|---|---|
| 2,331,687 | 10/1943 | Hobson | 264/97 |
| 3,339,231 | 9/1967 | Piotrowski | 425/342 |
| 3,513,506 | 5/1970 | Meingast | 425/450 |
| 3,616,491 | 11/1971 | Vollers | 425/DIG. 209 X |
| 3,707,591 | 12/1972 | Chalfant | 264/97 |

Primary Examiner—Francis S. Husar
Assistant Examiner—David B. Smith
Attorney, Agent, or Firm—Craig & Antonelli

[57] ABSTRACT

Apparatus for injection-blow molding hollow articles including an injection unit having a stationary injection platen facing oppositely to a relatively axially movable blow mold form and platen. A plurality of hollow article mandrels are positioned on each of first and second oppositely facing sides of an indexing device arranged between the injection platen and the blow mold platen. This indexing device is arranged for stepwise rotational sequential movement about a vertical axis extending between the first and second sides through four stations arranged 90° apart from one another. When said indexing device is in a first position, the mandrels on the first face are in alignment with the stationary injection platen, while oppositely facing mandrels on the second face are in alignment with the blow mold form. When said indexing device is in a second position rotated 90° from the first position, the mandrels that were previously in line with the stationary injection platen are now positioned at a curing station while the mandrels previously aligned with the blow mold platen are positioned at an ejection station. Spring loaded neck ring clamping members are arranged on the indexing device for holding the neck of a parison or molded product as it is sequentially moved with the mandrels through the stations of the apparatus. A cam and toggle mechanism is arranged on the indexing device for sequentially opening and closing the neck ring halves as the indexing device is rotated during operation of the machine. The neck ring halves associated with a particular set of mandrels are always open at the ejection station to permit ejection of the completed hollow articles and are usually closed at the injection, curing, and blow-molding stations. When the mandrels are aligned with the second station corresponding to curing of the parison, which second station is arranged between the injection station and the blow-molding station, the neck ring halves may be either open or closed depending upon whether the apparatus is initially starting up or is in continuous automatic operation. A clamping cylinder and toggle arrangement is provided for axially moving the blow molded platen and indexing unit with respect to one another and to the stationary injection platen such that oppositely facing mandrels are respectively in operative communication with the injection platen and with the blow mold form at the same time.

16 Claims, 7 Drawing Figures

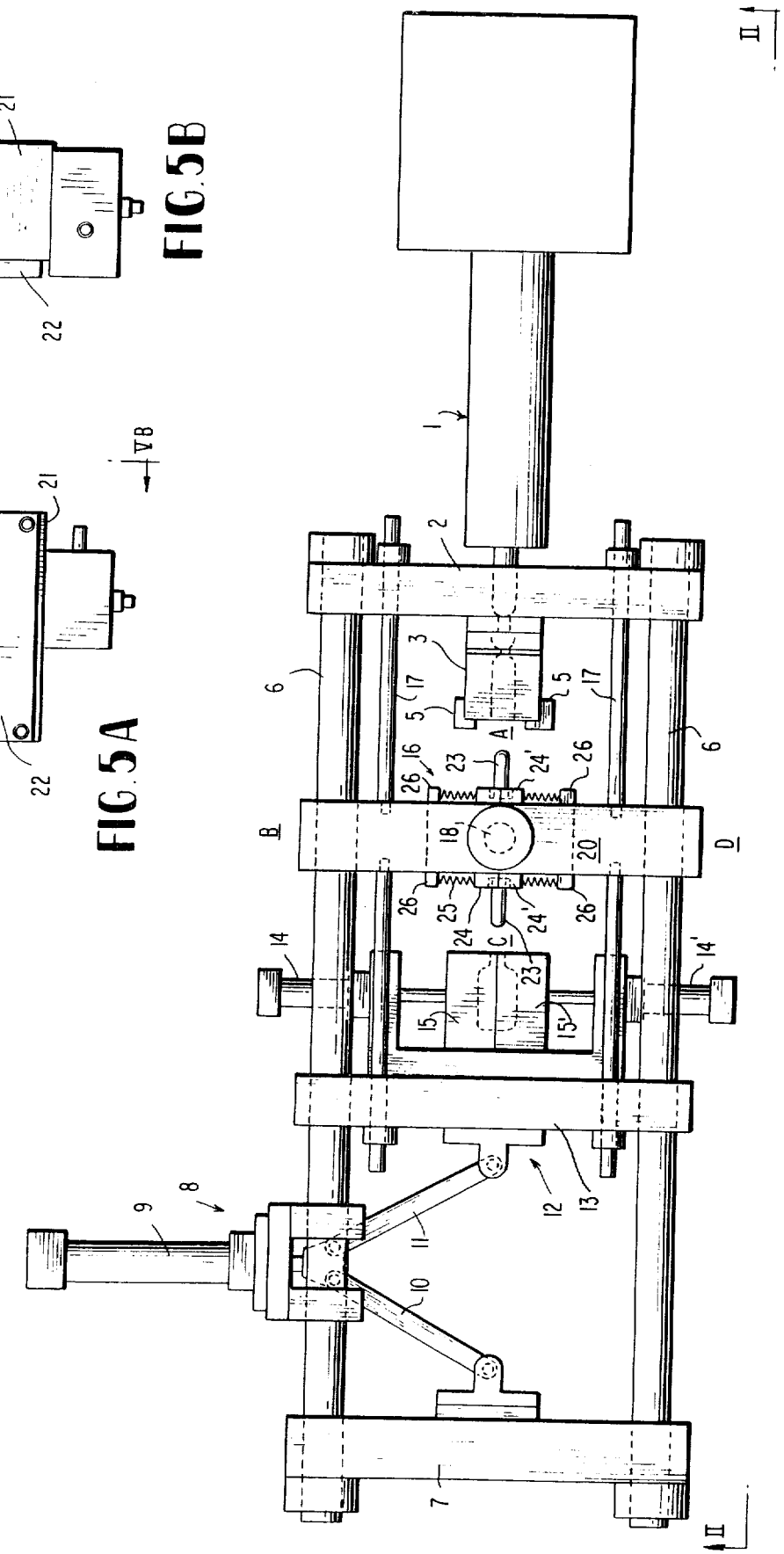
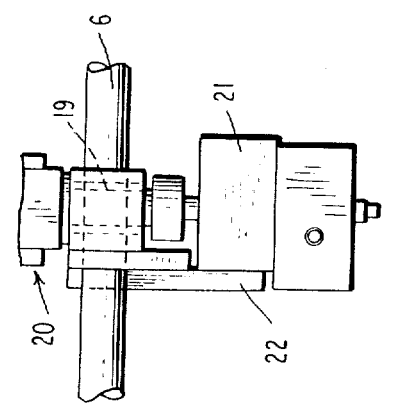
FIG.5B
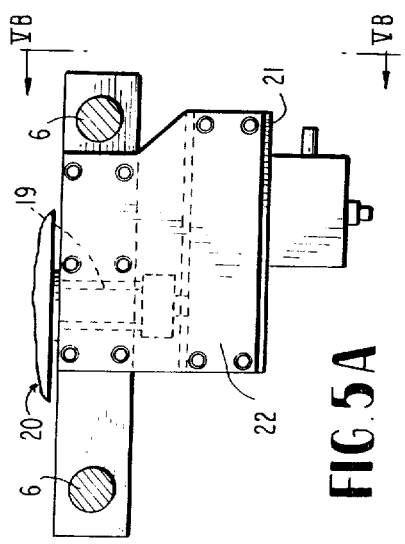
FIG.5A
FIG.1

APPARATUS FOR INJECTION-BLOW-MOLDING HOLLOW ARTICLES

BACKGROUND AND SUMMARY OF THE INVENTION

The present invention is related to apparatus for forming hollow plastic articles such as containers, jars, bottles, toys, collapsible tubes and similar hollow objects. The present invention is particularly related to problems associated with manufacturing hollow articles by means of a combination of injection-molding and blow-molding. My prior U.S. Pat. Nos. 3,364,520 and 3,594,463 described apparatus and methods for forming hollow articles by a combined injection and blow-molding operation. To the extent necessary for a complete understanding of the present invention, the disclosure of my above-mentioned prior patents is incorporated by reference herein.

The previous injection and blow molding apparatus for forming hollow articles provided distinct advantages in the formation of hollow bottles and the like in that a hollow article could be formed in one piece, even including complex structural parts such as the threaded neck portion of a bottle. In this connection, it is noted that the previous U.S. Pat. No. 3,594,463 described an arrangement for positioning neck ring molds which constituted a part of the injection mold, for forming the preliminary parison by an injection molding process. The neck ring mold arrangement was then maintained in position throughout the transfer of the parison to curing and blow molding stations until it was finally released from the finished molded product at an ejection station. These prior arrangements were particularly advantageous for automatic operations where the steps of injection molding, curing, blow molding and ejection of finished articles, could be carried on continuously.

However, a disadvantage with these prior arrangements resulted from the fact that a plurality of mandrels and molds were received at each station 4 or 6 involved and it was more difficult to remove the partially completed parison or parison molds when it was desired to shut down the apparatus for maintenance and the like. Also, the arrangement of the injection molds, blow molds, and indexing devices of these prior arrangements were relatively complex, thereby requiring high expenditures for both initial construction and maintenance during use. A further disadvantage of the prior arrangements of this type also related to the ease of removal of the finished products at the ejection station.

The present invention contemplates an arrangement which overcomes the above-mentioned difficulties. These difficulties are overcome by a novel arrangement of the injection platen, blow molding forms and platen, and the indexing mechanism which moves the hollow article through the various stages in the molding process. In one aspect of the present invention, it is contemplated to arrange the clamping connection between the partially finished hollow article and the indexing unit so as to permit optional removal of the parison immediately following the injection molding station so as to facilitate shut down and start up of the installation.

A particular embodiment of the present invention contemplates the arrangement of four stations positioned 90° from one another facing radially inwardly toward a rotatable indexing mechanism. The first station includes a stationary injection platen and an injection unit for injecting plastic around respective mandrels positioned on the indexing mechanism and within the hollow article to be formed. The second station includes curing means for curing the parison formed by the injection unit at the first station. The third station includes a blow molding unit for blow molding the parison mold into the final configuration while it is still positioned over the respective mandrel. The fourth station is an injection station and includes means for removing and conducting the finished hollow articles away from the molding machinery to a position where it can be used. An indexing unit is centrally disposed between the four above-described stations and includes two sets of radially outwardly facing mandrels, each set of mandrels being located approximately 180° from the next adjacent set of mandrels such that when the indexing unit is in an operative position, the two sets of mandrels face respective oppositely disposed stations (either the first and third or the second and fourth stations).

The invention further contemplates the provision of neck ring mold clamping means for engaging the neck part of a respective hollow object being formed on the associated mandrel. The present invention also contemplates means for maintaining the neck ring molds in a closed position corresponding to forming a mold or holding the neck of the hollow article in place, during movement through the first, second and third stations, while means are provided for normally maintaining the neck ring molds in open position when in the fourth position. The present invention further contemplates means for selectively opening or closing the neck ring molds when in the second station, which means include a movable cam mechanism engageable with toggle clamp parts of the mold ring halves. The present invention also contemplates means for sequentially moving the indexing mechanism through the four stations while also moving the blow mold forms and injection units with respect to one another so as to simultaneously injection mold one article at the first station while blow molding a second article at the third station.

Further objects, features and advantages of the present invention will become more obvious from the following description when taken in connection with the accompanying drawings, which show, for purposes of illustration only, one embodiment in accordance with the present invention, and wherein:

BRIEF DESCRIPTION OF THE DRAWINGS

FIG. 1 is a partial schematic top plan view of an injection-blow molding machine constructed according to the present invention;

FIG. 5A is a partial schematic end view taken in the direction of V—V of FIG. 2, and showing the mounting of the index mechanism;

FIG. 5B is a side view of the index mechanism taken in the direction of V-B—V-B of FIG. 5A.

DETAILED DESCRIPTION OF THE DRAWINGS

Figure 2:
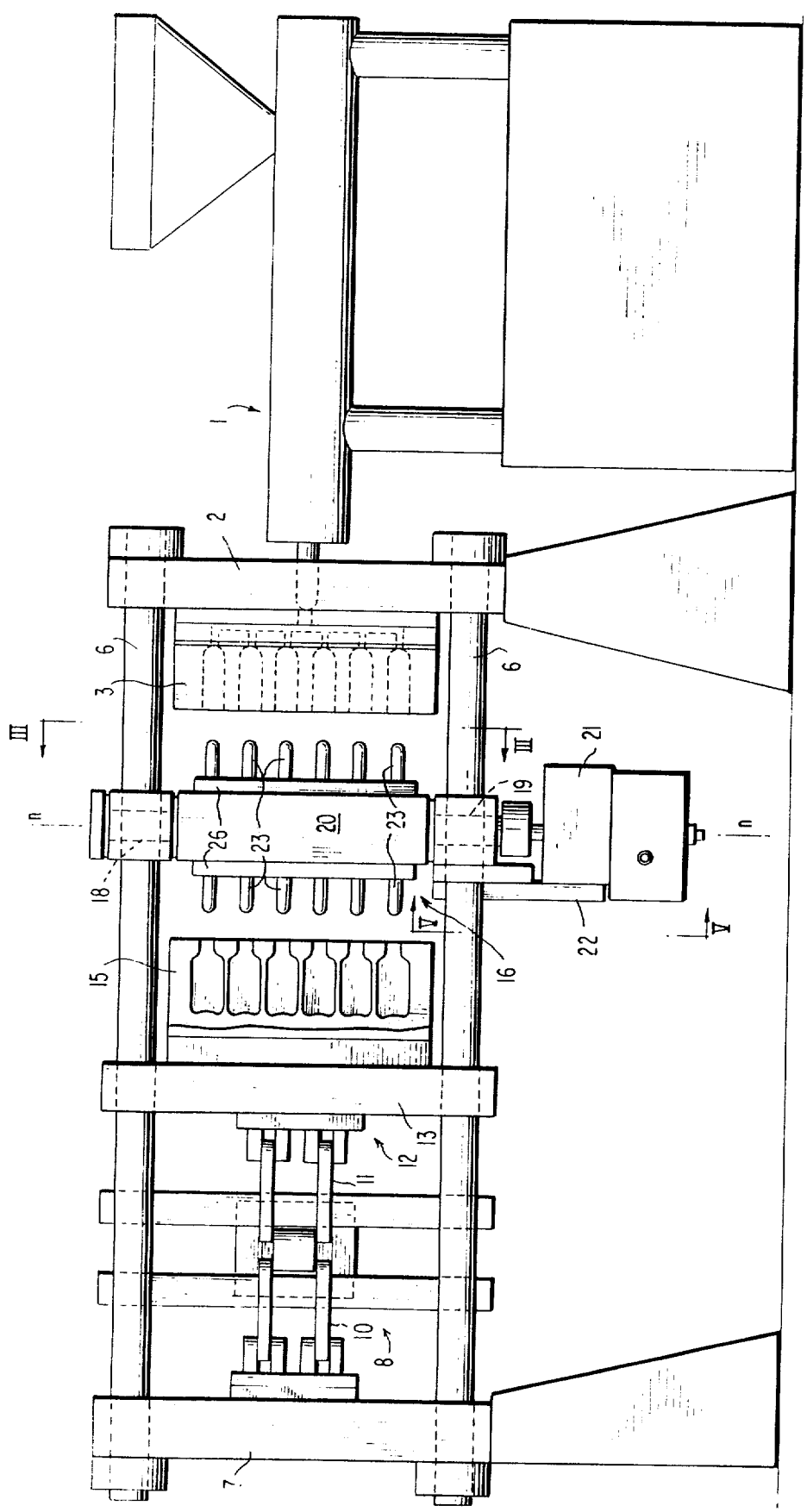
FIG. 2 is a partial schematic side view of the machine taken along line II—II of FIG. 1.

Although the specific embodiment of the invention described herein and illustrated in the drawing relates to the manufacture of a plastic container or bottle having a shape as shown in dash lines in FIG. 1, and as shown in solid lines in FIG. 2, it will be understood that the invention is not limited to the manufacture of bottles and that the apparatus and the method of the present invention is applicable to making containers, jars, toys, collapsible tubes and other hollow objects from any suitable synthetic resinous material which is capable of being injected and blown, such as, low density or high density polyethylene, styrene or vinyl, polypropylene polystyrene, polyvinyl chloride and nylon.

Figure 6:
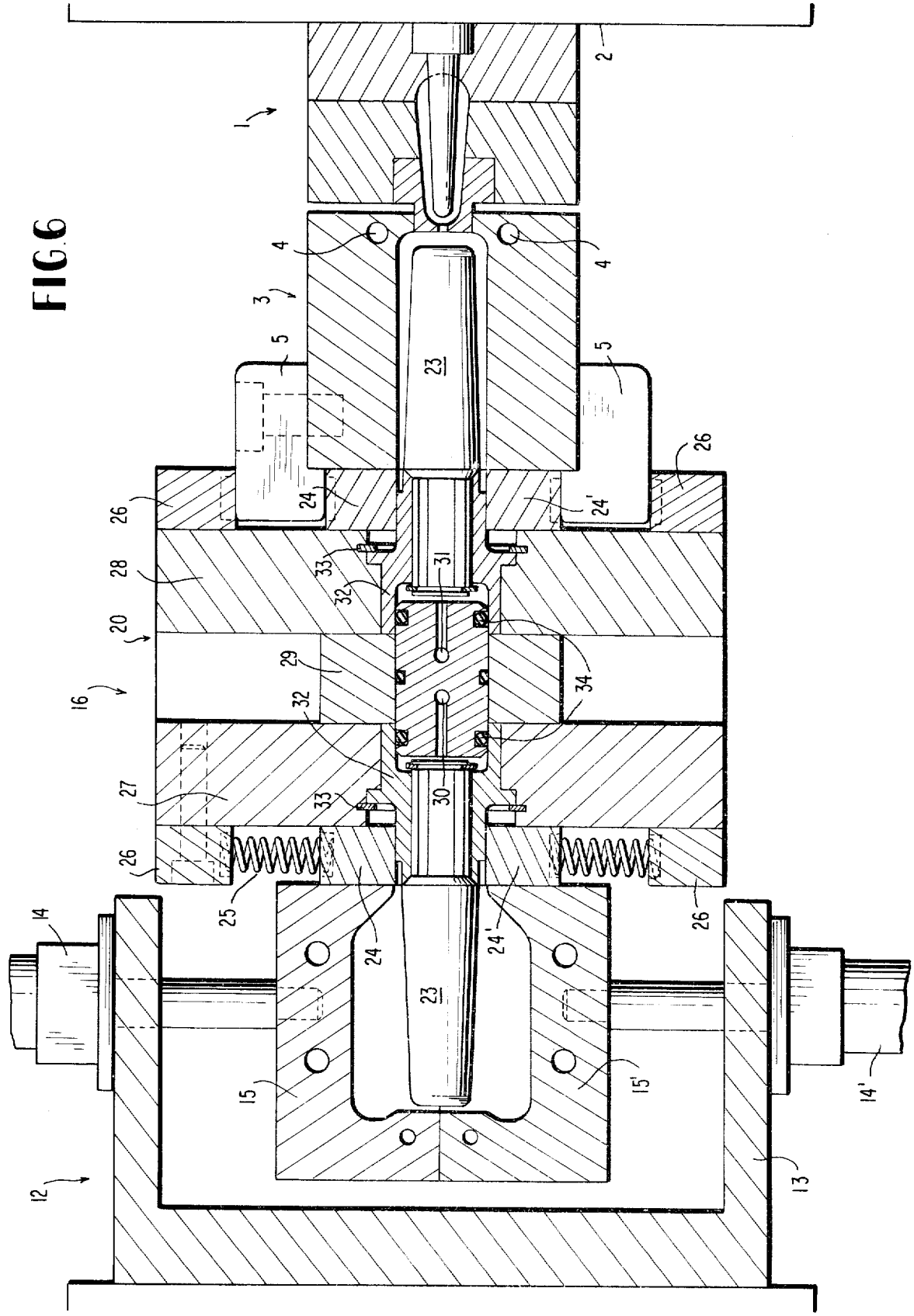
FIG. 6 is a partial detailed, enlarged, cross sectional plan view showing the operating parts of the machine with the machine in closed position ready to blow and injection mold hollow articles.

In the following description, similar reference numerals are used throughout the various figures for indicating similar structure. Referring to the drawings, and particularly to FIG. 1, an injection-blow molding machine according to the present invention is illustrated with an injection unit 1 arranged adjacent stationary injection platen 2 at the righthand side of the drawing. This injection unit includes a one piece parison mold 3 which is selectively communicable with plastic supply lines of the injection unit. Since the particular injection unit structure, including the means for heating and selectively supplying the heated plastic material to the parison mold 3, are generally known, a detailed description and illustration of the injection unit is not included herein. It is noted that FIG. 6 schematically illustrates fluid lines 4 for controlling the temperature of the parison mold 3. At the lefthand side of the parison mold 3, neck ring locking cams 5 are provided for a function to be described in more detail later. The stationary injection platen 2 is fixedly mounted at the righthand ends of tiebars 6, which tiebars form part of the basic frame of the injection-blow molding machine.

At the left end of the tiebars 6, a stationary clamping platen 7 is arranged for engagement with a clamping mechanism 8. This clamping mechanism 8 includes a clamping cylinder 9 in communication with toggle levers 10 and 11. Toggle lever 10 is pivotally connected to the stationary clamping platen 7 while toggle lever 11 is pivotally mounted at a blow molding platen unit 12, which blow molding unit is slidably movable along the tiebars 6. Consequently, clamping mechanism 8 can be actuated to selectively move the blow molding unit in the axial direction with respect to the injection unit 1.

The blow molding unit 12 includes a U-shaped housing 13 which carries a pair of blow mold clamping cylinders 14 and 14' connected to respective halves of a two piece blow mold 15, 15'. Cylinder actuating means, not shown because of conventional construction, are provided for selectively opening and closing the two piece blow mold 15, 15'.

In between the injection unit 1 and the blow molding unit 12, a mandrel supporting and indexing unit 16 is supported on the tiebars 6 for movement with the blow molding unit 12. This unit 16 is guidably movable in the axial direction along tiebars 6, but is maintained in a central position by drawbars 17. This unit 16 includes support shafts 18 and 19 arranged respectively at the upper and lower ends of the unit for rotatably supporting the mandrel support assembly 20. The unit 16 also includes an indexing mechanism 21 which is arranged adjacent the lower support shaft 19 for imparting rotative movement to the mandrel supporting assembly 20. This indexing mechanism 21 is attached by way of mounting plates 22 so as to be axially movable along with the unit 16. The indexing mechanism 21 includes means for imparting sequential 90° rotational movement to the mandrel supporting assembly 20. Since many types of conventional indexing units can be utilized for imparting this type of four stop movement, the details of the indexing mechanism have not been included herein. It will be understood by one skilled in the art that an indexing mechanism for rotationally moving the mandrel supporting assembly 20 such that a particular set of vertically aligned mandrels 23 will move sequentially through stations A, B, C, D indicated in FIG. 1. It will also be understood that known mechanisms for timing the particular rotative motion of the indexing mechanism can be utilized.

The mandrel supporting assembly 20 includes two sets of vertically aligned mandrels 23, spaced 180° from one another with respect to the axis of rotation n-n through support shafts 18 and 19. The supporting assembly 20 also includes a pair of neck ring molds 24, 24' for each of the two sets of mandrels 23. These neck ring molds 24, 24' are biased in a closed direction by springs 25 which have one end in engagement with relatively fixed rail members 26. These rail members 26, as best seen in FIG. 6, are attached by way of bolts or the like to spindle plates 27 and 28, which spindle plates in turn are rotatably supported at their outer ends by support shafts 18 and 19. An air manifold arrangement 29 is fitted between the spindle plates 27 and 28. This air manifold arrangement 29 includes air passages 30 and 31 for communication with the respective mandrels 23. Spindles 32 are fitted in the respective plates 27 and 28 and are held in position with snap rings 33. The mandrels 23, which also form blow pins or blow cores are fitted in the spindles 32 and are also held in place by snap rings.

Each of the mandrels or blow pins 23 have four flats to permit air passage from the respective openings 30 and 31. It is noted that each individual spindle 32 has its own passage that is sealed by means of the O rings 34.

Figure 3:
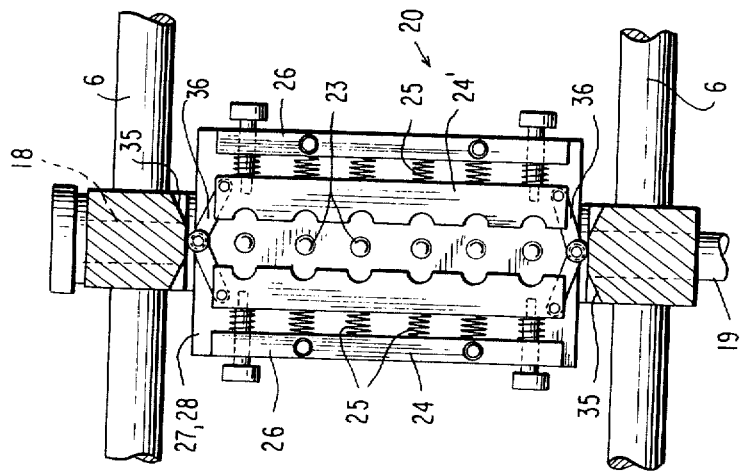
FIG. 3 is a partial schematic end view taken along the line III—III of FIG. 2, which shows the neck ring clamps in closed position.
Figure 4:
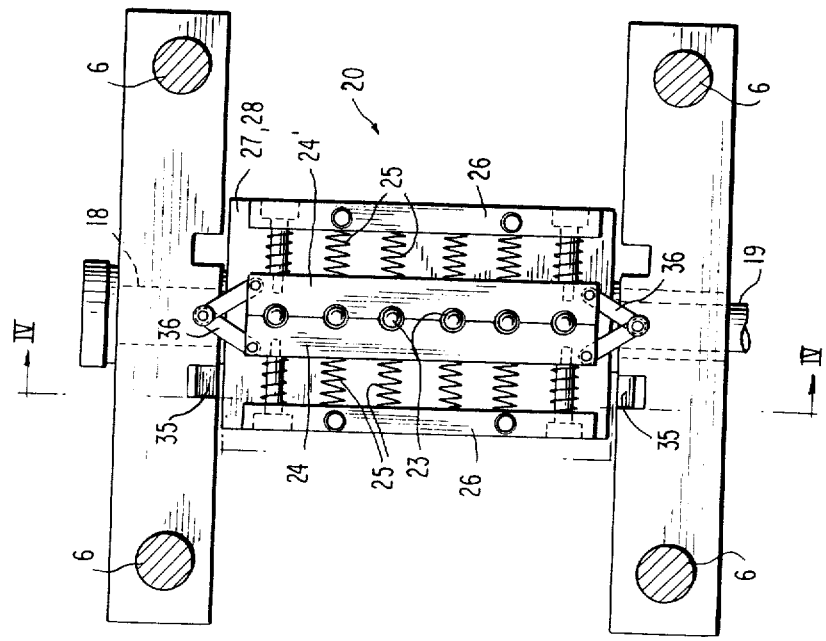
FIG. 4 is a partial schematic side view of the neck ring structure taken in the direction of IV—IV of FIG. 3, showing the neck rings in open position.

As best seen in FIGS. 3 and 4, the neck ring molds 24, 24' are actuated by way of cams 35 and toggle mechanisms 36. When the neck rings parts 24, 24' are in the closed position with the clamping unit closed as shown in FIG. 6 so that the mandrels are operatively engaged with the respective injection and blow molding units, neck ring locking cams 5 assist in keeping the neck ring halves 24 and 24' firmly closed. The cam and toggle arrangement 35, 36 normally maintains the neck ring mold parts 24 and 24' in closed condition whenever the indexing unit is in positions A, B and C, while always maintaining the neck ring mold halves 24 and 24' in open condition within index position D.

A selective actuating mechanism is provided for selectively adjusting the cam and toggle mechanism 35, 36 so as to open the ring mold halves 24, 24' when in index position B so as to facilitate removal of parison mold units during machine start up or shut down. An unobstructed open space is provided adjacent the machine at station B so as to permit ready access to the mandrel and to permit easy removal of the parison. During running on automatic cycle, the cam and toggle arrangement 35, 36 is readjusted so as to maintain the neck ring halves 24, 24' in closed condition for all three index positions A, B, C.

The operation of the machine according to the present invention is as follows. The actuation of the various above described elements of the machine during the automatic operation is controlled by automatic timers and limit switches, which automatic timers and limit switches by themselves can be of any known construction, and therefore a detailed description of these timer and limit switches is not included herein. Assuming that the machine is in the open condition as shown in FIG. 1, with the further feature that the blow mold parts 15 and 15' are also opened, the cycle starts and the clamping mechanism 8 moves the blow molding unit 12 and mandrel supporting and indexing unit 16 toward the right to the position shown in FIG. 6. When the units 12 and 16 have been moved to the position shown in FIG. 6, and when the blow mold parts 15 and 15' have been clamped together by cylinders 14 and 14', the injection unit injects the heated and softened plastic for filling the neck ring 24, 24' and parison mold 3. At the same time, the blow mold parts 15 and 15' have closed around a parison previously formed and cured at stations A and B, and air is supplied through the air passage 30 for blow molding the soft plastic into the shape of the blow mold parts 15 and 15'. Ater a predetermined time, and just preceding the actuation of clamping mechanism 8 to move units 12 and 16 to the left, the blow mold clamping cylinders 14 are activated for releasing the blow mold parts 15 and 15'. Once the blow molds parts 15 and 15' have been removed from the article, the clamping mechanism 8 returns the units 12 and 16 to the position shown in FIG. 1. At this point, the indexing mechanism 21 rotates the mandrel supporting assembly 20 by 90° so that the parisons formed at station A are moved to station B for curing and the molded parts formed at station D for ejection. When the parts previously at station C move to station D, the neck ring parts 24, 24' are opened by the cam and toggle mechanism 35, 36. As soon as the neck ring parts are fully opened, a limit switch (not shown) to a desired position for use or further operations. After the finished molded products have been ejected, the indexing mechanism 21 again rotates the mandrel supporting assembly 20 by 90° so that the cured parisons move from station B to station C and the empty mandrels move from station D to station A and the above described cycle starts all over again.

During periods of non-automatic operation, such as start up and shut down, the above described series of operations is changed in that the two oppositely facing sets of mandrels 23 are arranged at station B and D. The toggle and cam mechanism 35, 36 is selectively moved to open the neck ring mold parts 24 and 24' so as to permit removal of the parison now at station B. It can be understood that this selective opening or closing of the neck ring mold at station B places the parison in a position for easy removal. It is also understood that the only other parts possibly left on the mandrels are now at station D, where they are also in the clear and can be easily removed and conveyed to a desired point.

To further aid in understanding the sequence of the machine according to the present invention, following is a summary of the eleven operations performed in a complete sequence of operation:

1. Close up and lock neck rings at station A.
2. Inject parison at station A.
3. Open and remove parison from parison mold while maintaining neck rings clamped.
4. Rotate 90° from station A to station B.
5. Cure (or optionally remove) parison at station B.
6. Rotate 90° to station C.
7. Close blow molding unit over parison, close blow mold halves around parison.
8. Blow air into blow mold, cool, and exhaust air from blow mold.
9. Open blow mold halves and return blow molding units away from indexing unit.
10. Rotate 90° to station D, open neck ring halves.
11. Eject finished parts at station D.

While I have shown and described but one embodiment in accordance with the present invention, it is understood that the same is not limited thereto, but is susceptible of numerous changes and modifications as known to a person skilled in the art, and I therefore do not wish to be limited to the details shown and described herein but intend to cover all such changes and modifications as are within the scope of those skilled in the art.

I claim:

1. A machine for making articles of moldable material such as plastics and the like by sequentially injection molding a parison around a mandrel and blow molding the parison to form the finished hollow articles; said machine comprising: an injection molding station, a blow molding station, an intermediate station arranged between said injection molding station and said blow molding station and including an open space, mandrel means including at least one mandrel for forming a core support for a parison to be injection molded at the injection molding station, transfer means for transferring said mandrel and associated parison from said injection molding station to said blow molding station, clamping mold means arranged adjacent said mandrel and having a mold surface configuration corresponding to the final desired shape of a portion of the hollow article to be made, said clamping mold means being connected to said transfer means for movement with said mandrel from said injection molding station to said blow molding station, said clamping mold means including a plurality of parts forming a disengageable clamping connection with said portion of the hollow article for holding said parison on said mandrel during transfer from said injection molding station to said blow molding station, clamping means for normally maintaining said clamping mold means in clamping engagement with said parison throughout the transfer from the injection molding station to the blow molding station, and selectively actuable first disengaging means for selectively releasing said clamping mold means when said parison is at said intermediate station adjacent said open space to facilitate removal of said parison from said mandrel during shut down and start up of the machine, wherein said clamping mold means includes two parts, and wherein said clamping means includes spring means normally biasing said two parts toward one another, and wherein said first disengaging means includes a cam and toggle arrangement for moving said two parts away from one another against the action of the spring means.

2. A machine according to claim 1, further comprising an ejection station arranged after said blow-molding station and second disengaging means for automatically releasing said clamping mold means when said transfer means moves said mandrel and associated clamping mold means to said ejection station.

3. A machine for making hollow articles of moldable material such as plastics and the like by sequentially injection molding a parison around a mandrel and blow molding the parison to form the finished hollow article; said machine comprising: an injection molding station, a blow molding station, an intermediate station arranged between said injection molding station and said blow molding station and including an open space, mandrel means including at least one mandrel for forming a core support for a parison to be injection molded at the injection molding station, transfer means for transferring said mandrel and associated parison from said injection molding station to said blow molding station, clamping mold means arranged adjacent said mandrel and having a mold surface configuration corresponding to the final desired shape of a portion of the hollow article to be made, said clamping mold means being connected to said transfer means for movement with said mandrel from said injection molding station to said blow molding station, said clamping mold means including a plurality of parts forming a disengageable clamping connection with said portion of the hollow article for holding said parison on said mandrel during transfer from said injection molding station to said blow molding station, clamping means for normally maintaining said clamping mold means in clamping engagement with said parison throughout the transfer from the injection molding station to the blow molding station, and selectively actuable first disengaging means for selectively releasing said clamping mold means when said parison is at said intermediate station adjacent said open space to facilitate removal of said parison from said mandrel during shut down and start up of the machine, wherein said clamping mold means includes two parts, and wherein said clamping means includes spring means normally biasing said two parts toward one another, and wherein said injection station includes cam means for assisting the spring means in holding the two parts together during the injection molding operation.

4. A machine according to claim 3, wherein said injection molding station and said blow molding station are arranged in facing relationship to one another, and wherein said transfer means is located between said injection molding station and said blow molding station.

5. A machine according to claim 4, wherein said transfer means includes a rotatable indexing unit having a vertical axis of rotation, and wherein said mandrel has a free end extending radially outwardly from said vertical axis.

6. A machine according to claim 4, wherein said mandrel means consists of two sets of mandrels arranged along two oppositely facing vertical sides of said indexing unit such that one set of mandrels is in facing relationship with said injection molding station while the other set of mandrels is in facing relationship with the blow molding station.

7. A machine for making hollow articles of moldable material such as plastics and the like by sequentially injection molding a parison around a mandrel and blow molding the parison to form the finished hollow article; said machine comprising: an injection molding station, a blow molding station, an intermediate station arranged between said injection molding station and said blow molding station and including an open space, mandrel means including at least one mandrel for forming a core support for a parison to be injection molded at the injection molding station, transfer means for transferring said mandrel and associated parison from said injection molding station to said blow molding station, clamping mold means arranged adjacent said mandrel and having a mold surface configuration corresponding to the final desired shape of a portion of the hollow article to be made, said clamping mold means being connected to said transfer means for movement with said mandrel from said injection molding station to said blow molding station, said clamping mold means including a plurality of parts forming a disengageable clamping connection with said portion of the hollow article for holding said parison on said mandrel during transfer from said injection molding station to said blow molding station, clamping means for normally maintaining said clamping mold means in clamping engagement with said parison throughout the transer from the injection molding station to the blow molding station, and selectively actuable first disengaging means for selectively releasing said clamping mold means when said parison is at said intermediate station adjacent said open space to facilitate removal of said parison from said mandrel during shut down and start up of the machine, wherein said injection molding station and said blow molding station are arranged in facing relationship to one another, and wherein said transfer means is located between said injection molding station and said blow molding station, wherein said mandrel means consists of two sets of mandrels arranged along two oppositely facing vertical sides of said indexing unit such that one set of mandrels is in facing relationship with said injection molding station while the other set of mandrels is in facing relationship with the blow molding station, wherein said clamping mold means includes a two part clamp for each set of mandrels, wherein said clamping means includes spring means normally biasing said two parts toward one another, and wherein said first disengaging means includes a cam and toggle arrangement for moving said two parts away from one another against the action of the spring means.

8. A machine according to claim 7, wherein said blow molding station, said indexing unit and said injection molding station are mounted on axially extending tiebars, and wherein moving means are provided for selectively moving said blow molding and injection molding station with respect to said indexing unit into and out of operative engagement with the mandrels.

9. A machine according to claim 8, wherein said injection molding station is fixed in position on said tiebars, and wherein said blow molding station and indexing unit are movable along said tiebars.

10. A machine according to claim 9, wherein said moving means includes a piston-cylinder and toggle means.

11. A machine according to claim 8, wherein said intermediate station is a curing station located radially outwardly of said vertical axis at a position 90° from each of said blow molding and injection molding stations.

12. A machine according to claim 11, further comprising an ejection station located radially outwardly of said vertical axis at a position 180° from said intermediate station.

13. A machine according to claim 12, wherein said indexing unit includes means for sequentially moving the sets of mandrels in 90° intervals such that one set of mandrels is moved from said injection molding station to said intermediate station then to said blow molding station and lastly to said ejection station.

14. A machine according to claim 13, wherein control means are provided for actuating said moving means to move said molding stations into operative engagement when the sets of mandrels are facing the respective molding stations so as to facilitate the simultaneous injection molding of parisons on one set of mandrels and blow molding of finished hollow articles at the other set of mandrels.

15. A machine according to claim 14, wherein said control means also includes means for actuating said moving means to move said molding stations out of operative engagement after the molding operations to facilitate advancing of the indexing unit.

16. A combination injection and blow-molding machine comprising: an indexing unit, a plurality of mandrels arranged on said indexing unit for supporting parisons and molded units for movement between an injection unit station and a blow molding unit station, neck ring molds of multiple part constructions arranged adjacent said mandrels for forming neck ring molds and for supporting the parison as it is moved from the injection unit station to the blow-mold unit station, means for normally maintaining said neck ring molds in closed position at all times between said injection unit and said blow mold unit, indexing means for moving said mandrels and associated neck ring molds from a position in cooperation with the injection unit to a second position intermediate the injection and blow mold units, and means for selectively opening said neck ring molds when in said intermediate position so as to permit removal of the parison mold during shut down or start up of the machine, wherein said indexing means has a vertical axis located between said injection and blow mold units and said mandrels extend radially horizontally outwardly from said vertical axis, said mandrels consisting of two sets of vertically aligned mandrels arranged 180° from each other with respect to said vertical axis, said injection and blow mold units being aligned with one another such that when one set of mandrels is at the injection unit, the other set of mandrels is at the blow mold unit, wherein a curing unit is arranged between said injection and blow mold units at a position displaced 90° from each of said injection and blow mold units, wherein an ejection unit is arranged opposite said curing station at a position also spaced 90° from each of said injection and blow mold units, wherein said indexing means includes means for sequentially rotating said sets of mandrels about said vertical axis in 90° increments whereby in a first position the two sets of mandrels are positioned respectively at the injection and blow mold units and whereby in a second position the two sets of mandrels are positioned respectively at the curing unit and the ejection unit, wherein said means for normally maintaining said neck ring molds in closed position are operable throughout all positions of the mandrels except when at the ejection unit, and wherein said means for selectively opening said neck ring molds include cam means cooperating with toggle levers arranged for overcoming a spring means normally closing said neck ring molds.

* * * * *